United States Patent
James et al.

(10) Patent No.: US 10,358,141 B2
(45) Date of Patent: Jul. 23, 2019

(54) METHODS AND APPARATUS TO EXTRICATE A VEHICLE FROM A STUCK CONDITION

(71) Applicant: Ford Global Technologies, LLC, Dearborn, MI (US)

(72) Inventors: Alex James, Ypsilanti, MI (US); Donald A. Perlick, Farmington Hills, MI (US); Thomas Salmon, Rochester, MI (US); Bang Kim Cao, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 312 days.

(21) Appl. No.: 15/332,451

(22) Filed: Oct. 24, 2016

(65) Prior Publication Data

US 2018/0111625 A1     Apr. 26, 2018

(51) Int. Cl.
*B60W 30/18* (2012.01)
*B60W 50/00* (2006.01)
*B60W 10/06* (2006.01)
*B60W 10/184* (2012.01)
*B60W 10/10* (2012.01)

(52) U.S. Cl.
CPC ........ *B60W 50/0098* (2013.01); *B60W 10/06* (2013.01); *B60W 10/10* (2013.01); *B60W 10/184* (2013.01); *B60W 30/18009* (2013.01); *B60W 2050/0004* (2013.01); *B60W 2530/00* (2013.01); *B60W 2600/00* (2013.01); *Y02T 10/76* (2013.01)

(58) Field of Classification Search
CPC ....... B60W 30/18045; B60W 2550/10; B60W 2550/14; B60W 2900/00
See application file for complete search history.

(56) References Cited

U.S. PATENT DOCUMENTS

| | | | |
|---|---|---|---|
| 7,302,333 B2 * | 11/2007 | Steen | B60K 28/16 180/197 |
| 7,792,625 B2 | 9/2010 | Hrovat et al. | |
| 8,244,445 B2 | 8/2012 | Luehrsen et al. | |
| 9,037,341 B2 | 5/2015 | James et al. | |
| 2007/0255465 A1 * | 11/2007 | Brown | B60G 17/0165 701/37 |

(Continued)

FOREIGN PATENT DOCUMENTS

| | | |
|---|---|---|
| FR | 2978704 | 2/2013 |
| JP | H07251730 | 10/1995 |
| JP | 2006177166 | 7/2006 |

OTHER PUBLICATIONS

AA1Car, "Traction Control," retrieved from http://www.aa1car.com/library/traction_control.htm, Jun. 15, 2016, 5 pages.

*Primary Examiner* — Edwin A Young
(74) *Attorney, Agent, or Firm* — Ray Coppiellie; Hanley, Flight & Zimmerman, LLC (57) ABSTRACT

Methods and apparatus to extricate a vehicle from a stuck condition, apparatus, systems and articles of manufacture are disclosed. An example method includes receiving a command to place a vehicle in a stuck mode. The stuck mode corresponds to an autonomous control mode of the vehicle. The method further includes autonomously controlling the vehicle in the stuck mode to attempt to extricate the vehicle from a stuck condition.

20 Claims, 6 Drawing Sheets

(56) References Cited

U.S. PATENT DOCUMENTS

| | | | |
|---|---|---|---|
| 2012/0095657 A1* | 4/2012 | Pudvay | F16H 59/12 701/53 |
| 2013/0096787 A1* | 4/2013 | Holub | F16H 61/12 701/54 |
| 2015/0291169 A1* | 10/2015 | Mair | B60W 30/18045 701/1 |

* cited by examiner

METHODS AND APPARATUS TO EXTRICATE A VEHICLE FROM A STUCK CONDITION

FIELD OF THE DISCLOSURE

This disclosure relates generally to driver assistance and, more particularly, to methods and apparatus to extricate a vehicle from a stuck condition.

BACKGROUND

Traction control in a vehicle serves to reduce the amount of slippage (e.g., loss of traction) that occurs between the wheels of the vehicle and the surface on which the vehicle is traveling. This may be accomplished by reducing the torque delivered to the wheels and/or by applying a braking force to the wheels. While traction control improves the safety of the vehicle in many circumstances, there are situations where traction control is undesirable. For example, when the vehicle is stuck in a rut that provides little traction (e.g., formed of snow, mud, sand, or another deformable material), traction control can undermine efforts to spin the wheels in alternating directions to rock the vehicle until it becomes free of the rut.

SUMMARY

Methods and apparatus to extricate a vehicle from a stuck condition are disclosed. An example method includes receiving a command to place a vehicle in a stuck mode. The stuck mode corresponds to an autonomous control mode of the vehicle. The example method further includes autonomously controlling the vehicle in the stuck mode to attempt to extricate the vehicle from a stuck condition.

An example apparatus includes a user interface to receive a command to place a vehicle in a stuck mode. The stuck mode corresponds to an autonomous control mode of the vehicle. The apparatus also includes a stuck mode controller to autonomously control the vehicle in the stuck mode to attempt to extricate the vehicle from a stuck condition.

An example tangible computer readable storage medium comprising instructions is disclosed that, when executed cause a machine to at least receive a command to place a vehicle in a stuck mode. The stuck mode corresponds to an autonomous control mode of the vehicle. The instructions further cause the machine to autonomously control the vehicle in the stuck mode to attempt to extricate the vehicle from a stuck condition.

DETAILED DESCRIPTION

Figure 1:
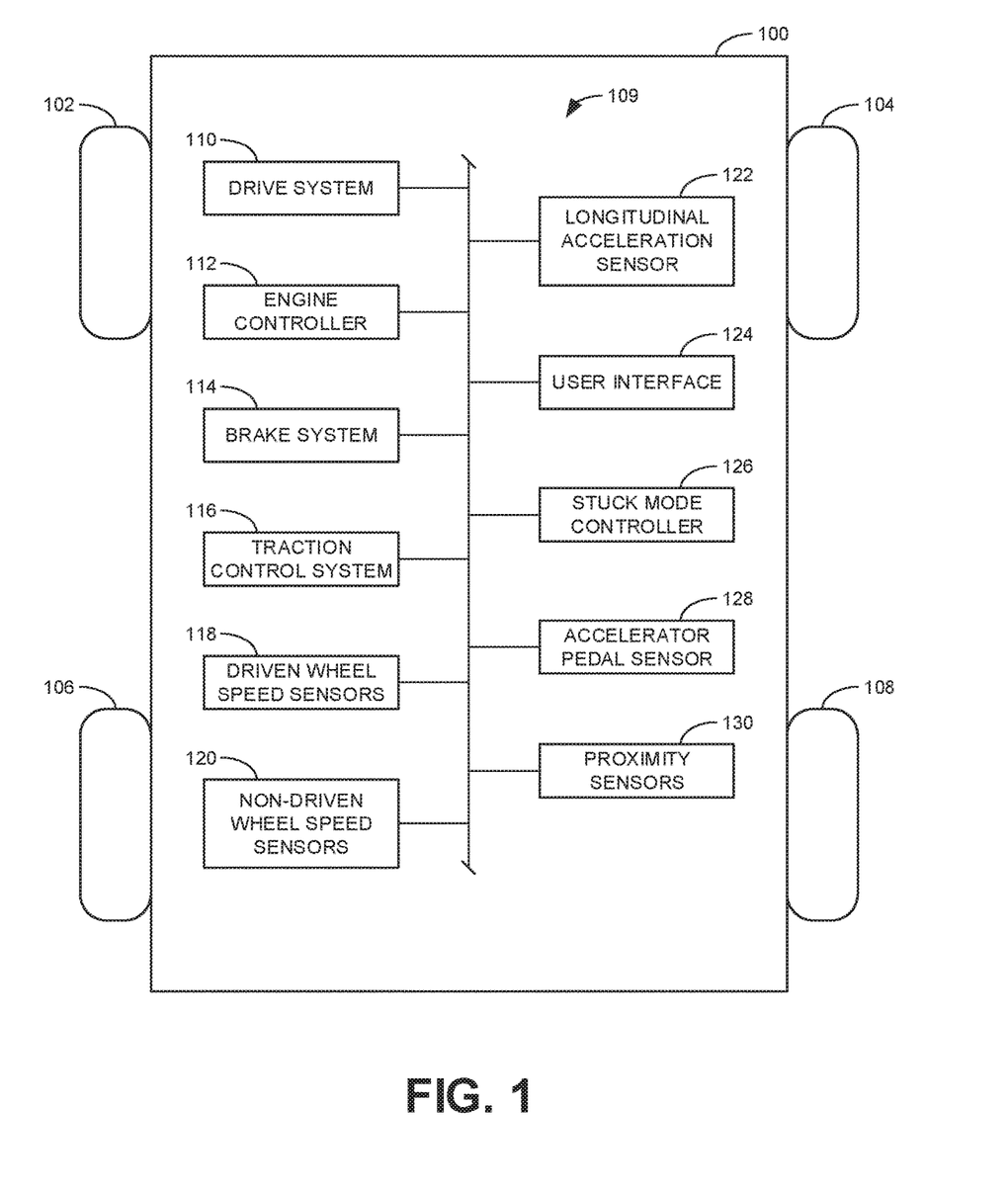
FIG. 1 is a block diagram of an example control system of an example vehicle.

FIG. 1 is a block diagram of an example vehicle 100 with two front wheels 102, 104 and two rear wheels 106, 108. In the illustrated example, the vehicle 100 includes a control system 109 that includes a drive system 110 operatively coupled to a drivetrain to provide power to the front wheels 102, 104 of the vehicle 100. That is, for purposes of explanation, the vehicle 100 is a front-wheel drive vehicle. However, the teachings disclosed herein may be suitably adapted to other types of vehicles (e.g., all-wheel drive vehicles, rear-wheel drive vehicles, etc.).

As used herein, the wheels that receive power through the drivetrain (e.g., the front wheels 102, 104 in FIG. 1) are referred to as driven wheels, whereas the wheels that do not receive power through the drivetrain (e.g., the rear wheels 106, 108) are referred to as non-driven wheels. The power source to drive the driven wheels 102, 104 may include any suitable type of power generating system such as, for example, a gas powered combustion engine, a battery powered motor, or a hybrid system. In some examples, the drive system 110 is associated with an engine controller 112 to control the amount of torque provided to the driven wheels 102, 104.

In the illustrated example of FIG. 1, the control system 109 of the vehicle 100 is provided with a brake system 114 to control brakes operatively coupled to the wheels 102, 104, 106, 108. The brake system 114 may be any of an electric system, an electro-hydraulic system, or a hydraulic system. Typically, the brakes are activated in response to driver input via a brake pedal. In some examples, the brake system may automatically activate the brakes based on input from a traction control system 116 and/or any other electronic control unit (ECU).

In some examples, the traction control system 116 is communicatively coupled to wheel speeds sensors including driven wheel speed sensors 118 (e.g., associated with the driven wheels 102, 104) and non-driven wheel speed sensors 120 (e.g., associated with the non-driven wheels 106, 108). The traction control system 116 may detect a slip condition when at least some of the wheels 102, 104, 106, 108 are slipping based on feedback from the wheel speed sensors 118, 120. For example, a difference between the average speed of the driven wheels 102, 104 and the average speed of the non-driven wheels 106, 108 that exceeds a threshold may indicate the wheels are slipping. More particularly, the speed of the non-driven wheels 106, 108 may be used to measure the speed of the vehicle 100 because the non-driven wheels 106, 108 roll along the ground as the vehicle 100 moves. Thus, if the driven wheels 102, 104 are moving significantly faster than the non-driven wheels 106, 108 (e.g., above the threshold), it is likely that the driven wheels 102, 104 are spinning relative to the movement of the vehicle 100 along the surface of the ground. In such examples, the traction control system 116 may generate a control signal or torque command for the engine controller 112 to reduce the amount of torque delivered to the driven wheels 102, 104 via the drive system 110. Additionally or alternatively, the traction control system 116 may generate a braking command to actuate the brakes associated with the wheels 102, 104, 106, 108 via the brake system 114 in response to sensing the slipping of the wheels.

In some examples, where the vehicle 100 is all-wheel drive, there are no non-driven wheels to measure the vehicle speed for comparison to the speed of the driven wheels. In some such examples, the traction control system 116 may detect slip conditions based on feedback from other sensors such as, for example, a longitudinal acceleration sensor 122. Based on the detected acceleration of the vehicle 100, the speed of the vehicle 100 may be determined for comparison to the speed of the driven wheels. Other types of sensors may also provide inputs to the traction control system 116 such as, for example, an ambient temperature sensor, a yaw rate sensor, a lateral acceleration sensor, a roll rate sensor, etc. Feedback from these sensors may be used by the traction control system 116 to further verify slip conditions and/or detect different types of slip conditions and/or associated metrics of the stability of the vehicle 100.

A particular type of a slip condition occurs when the average speed of the non-driven wheels 106, 108 (or other measure of the speed of the vehicle 100) is approximately zero while the average speed of the driven wheels 102, 104 is greater than or equal to a threshold speed above zero. This slip condition is referred to herein as a stuck condition because the vehicle 100 is substantially not moving despite the spinning of the driven wheels 102, 104. Stuck conditions may arise when the one or more of the driven wheels 102, 104 are within a rut that provides relatively little traction for the wheels to escape the rut. Often the rut is the result of the vehicle 100 driving over a deformable material (e.g., snow, sand, mud, etc.) that gives way under the weight of the vehicle 100 and/or is moved by the rotation of the wheels 102, 104. In other situations, the rut may be substantially solid but still provide little traction (e.g., ice).

When a vehicle is in a stuck condition, it is sometimes possible to extricate the vehicle 100 by spinning the wheels 102, 104 within the rut repeatedly in opposite directions to rock the vehicle back and forth. The momentum of the vehicle 100 created by the rocking motion in conjunction with the spinning of the vehicles 100 may be sufficient to ultimately free the vehicle 100 from the rut so that the vehicle 100 can move again.

While traction control is beneficial under many circumstances, the traction control feature can undermine efforts to remove a vehicle from a stuck condition because it reduces the spinning of the driven wheels 102, 104. Accordingly, when a vehicle is in a stuck condition, a driver may desire to manually disable the traction control. Some vehicles include a physical switch to manually toggle the traction control between ON and OFF states. Other vehicles may be provided with a soft switch accessed via a display screen associated with a user interface (e.g., the user interface 124) to disable and enable the traction control. In U.S. Pat. No. 9,037,341, systems and methods for displaying a traction control ON/OFF menu on such a display screen upon detection that the vehicle 100 is in a condition in which the driver may desire to deactivate the traction control are disclosed. U.S. Pat. No. 9,037,341 is incorporated herein by reference in its entirety.

In some examples disclosed herein, a stuck mode controller 126 is provided to detect that the vehicle 100 is in a stuck condition and automatically instruct the traction control system 116 to deactivate the traction control when a driver is attempting to extricate the vehicle 100. Further, once the stuck mode controller 126 detects that the vehicle 100 has become unstuck, the stuck mode controller 126 may instruct the traction control system 116 to automatically reactivate traction control. The automatic deactivation and activation of traction control without human input saves a person time from having to manually deactivate the traction control and/or from having to learn where the manual switch may be accessed (either a physical switch or as a soft switch via the user interface 124). Furthermore, automatic disablement and enablement of the traction control helps avoid the possibility of drivers forgetting to reactivate the traction control once their vehicles are unstuck. Further still, automatically turning the traction control OFF and ON without depending on a direct command to do so from a human may help drivers who are not aware of the option to disable traction control and/or who do not think about the traction control when under the stress and frustration of their vehicles being in a stuck condition.

Caution should be taken when removing human involvement in the deactivation of a safety feature such as traction control. Accordingly, in some examples, traction control is automatically deactivated only when there is a high level of confidence that the vehicle 100 is, in fact, in a stuck condition. In some examples, the stuck mode controller 126 obtains this confidence by detecting a stuck condition based on the speeds of the driven wheels 102, 104 and the non-driven wheels 106, 108, as described above, and verifying the determination by sensing the driver of the vehicle 100 attempting to rock the vehicle 100 by repeatedly spinning the wheels alternately in the forward and reverse directions. Thus, in addition to feedback from the driven wheel speed sensors 118 and the non-driven wheel speed sensors 120 and/or the longitudinal acceleration sensor 122, the stuck mode controller 126 may receive as additional input parameters, the current gear of the transmission (e.g., whether in drive or reverse), and the requested torque or throttle position (e.g., provided by an accelerator pedal sensor 128) to indicate the driver's intent to rock the vehicle 100 by alternately torqueing the wheels in the forward and reverse directions.

When the input parameters monitored by the stuck mode controller 126 are indicative of a stuck condition and the actions of the driver are indicative of an intent to rock the vehicle 100, the stuck mode controller 126 may have sufficient confidence to automatically disable the traction control (e.g., by generating an appropriate command to the traction control system 116) to assist the driver's efforts to extricate the vehicle 100. Once the stuck mode controller 126 detects that the vehicle 100 is no longer in a stuck condition and/or the driver is no longer attempting to rock the vehicle 100, the stuck mode controller 126 may cause the traction control to be reactivated.

In some examples, the stuck mode controller 126 serves to autonomously extricate the vehicle 100 from a stuck condition without human involvement. That is, in some examples, the stuck mode controller 126 may operate in conjunction with the drive system 110, the engine controller 112, the brake system 114, and the traction control system 116 to automatically control the steering, braking, gear shifts, and engine throttling to autonomously rock the vehicle 100 out of a rut associated with a stuck condition. While the process may be autonomous, in some examples, a driver may first provide a command (e.g., select a "stuck mode" option via the user interface 124) to activate the stuck mode controller 126 before the vehicle 100 begins autonomous control. In some examples, in response to detecting that the vehicle 100 is in a stuck condition, the traction control system 116 may generate a prompt (e.g., displayed via the user interface 124) for the driver to authorize the stuck mode controller 126 to initiate autonomous control of the vehicle 100.

In some examples, when a driver places the vehicle 100 in a stuck mode (e.g., activates the stuck mode controller 126) associated with autonomous control, traction control may be automatically deactivated. Once the stuck mode controller 126 is deactivated, traction control may be automatically restored. In some examples, the stuck mode controller 126 is automatically deactivated (and traction control enabled) when the stuck mode controller 126 detects that the vehicle 100 is no longer in a stuck condition. The stuck mode controller 126 may be deactivated by the driver aborting the autonomous control of the vehicle 100. For example, the driver may abort the autonomous control by selecting an option via the user interface 124 to cancel the stuck mode. Additionally or alternatively, in some examples, the autonomous control of the vehicle 100 by the stuck mode controller 126 may automatically abort if the driver attempts to take control of any aspect of the vehicle 100 currently being controlled by the stuck mode controller 126. For example, if the driver steps on the accelerator pedal, steps on the brake pedal, or turns the steering wheel, the stuck mode controller 126 may automatically deactivate the stuck mode (and enable traction control). In some examples, traction control may not be entirely deactivated while the stuck mode controller 126 is autonomously controlling the vehicle 100 but the thresholds and other parameters used to reduce torque and/or apply brakes may be adjusted to the particular circumstances of extricating the vehicle 100 from a stuck condition.

In the illustrated example, the control system 109 of the vehicle 100 is provided with proximity sensors 130 to detect the environment surrounding the vehicle 100. For example, the proximity sensors 130 may detect the distance and location of nearby objects (e.g., fences, trees, curbs, walls, other vehicles, etc.) relative to the vehicle 100. In some examples, feedback from the proximity sensors 130 is used as input parameters to the stuck mode controller 126 to determine the available space or envelope surrounding the vehicle 100 within which the vehicle 100 may maneuver while being rocked in a stuck condition. In some examples, the determination of a maneuverability envelope informs how the vehicle 100 is autonomously controlled. For example, if the proximity sensors 130 detect a lamp post (or any other object) in front of and to the left of the vehicle 100, the stuck mode controller 126 may direct the front wheels 102, 104 to the right to avoid the object. As another example, if another vehicle (or any other object) is detected in close proximity to the rear of the vehicle 100, the stuck mode controller 126 may control the amount of torque provided by the engine (via the engine controller 112) to be relatively low when the vehicle 100 is moving in reverse (towards the detected vehicle) as compared with a much higher torque provided when moving forward (away from the detected vehicle). In some examples, feedback from the proximity sensors 130 is monitored in substantially real-time during autonomous control of the vehicle 100 to detect in changes in the maneuverability envelope.

In some examples, the stuck mode controller 126 controls the timing of the shifting between reverse and forward gears and the associated throttling of the engine to take advantage of the momentum of the vehicle 100 as it rocks. That is, while slight movement of the vehicle 100 in a stuck condition within a rut typically occurs as the driven wheels 102, 104 are spun, when the wheels stop spinning and/or traction between the wheels and the underlying surface is lost, the wheels 102, 104 may slide back into the rut. The momentum of the vehicle 100 sliding back into the rut can be used advantageously by reversing the direction of the wheels so that they spin in the same direction that the vehicle 100 is already sliding. Repeating this process in both directions as the vehicle 100 is rocked back and forth can enable the wheels 102, 104 to ultimately escape the rut and free the vehicle 100 from the stuck condition. In some examples, the stuck mode controller 126 times the spinning of the wheels 102, 104 to begin at approximately the same time that the vehicle 100 stops moving up the rut and begins to slide back into the rut. In this manner, the combined effect of the spinning wheels and the momentum of the vehicle 100 is taken advantage of during the full distance that the vehicle 100 moves when sliding back into the rut.

In some examples, the stuck mode controller 126 determines the timing for spinning the wheels 102, 104 based on feedback from the driven wheel speed sensors 118, the non-driven wheel speed sensors 120, and the longitudinal acceleration sensor 122. In kinematics, the relationship between velocity, acceleration, and time can be expressed by Equation 1 below:

$$V_f = V_o + at \qquad (1)$$

where $V_f$ is the final velocity, $V_o$ is the original velocity, a is the acceleration, and t is the time to reach the final velocity ($V_f$). In some examples, the stuck mode controller 126 uses Equation 1 to estimate the time (t) when the vehicle 100 will stop moving and, thus, begin sliding back into the rut. In some such examples, the original velocity ($V_o$) in the above equation corresponds to the speed of the vehicle 100 determined based on the speed of the non-driven wheels 106, 108 as provided by the non-driven wheel speed sensors 120. The acceleration (a) in the above equation corresponds to the acceleration of the vehicle 100 provided by the longitudinal acceleration sensor 122. The final velocity ($V_f$) goes to zero as it corresponds to when the vehicle 100 stops moving and is about to begin sliding back into the rut. Setting $V_f=0$ and solving for t provides Equation 2 below:

$$t = -V_o/a \qquad (2)$$

The acceleration (a) will be negative to cancel out the negative in Equation 2 because the vehicle 100 is slowing down. Thus, using absolute values, the time (t) until the vehicle 100 stops moving (and the wheels are to start spinning in the other direction) can be estimated as the ratio of the velocity of the vehicle 100 to the acceleration of the vehicle 100.

While the time when the vehicle 100 is expected to stop moving and begin sliding can be estimated to determine when to begin spinning the wheels, shifting gears in a transmission and delivering torque to the wheels cannot be done instantaneously. Rather, there is some time lag. While each vehicle is different, examples time lags may be approximately 0.75 seconds. In some examples, the stuck mode controller 126 stores the time lag for comparison against the time (t) in Equation 2. In some examples, the stuck mode controller 126 initiates the transmission shift when the time (t) approximately equals the time lag to shift gears and throttle the engine. In this manner, torque delivered to the wheels begins approximately at the same time that the vehicle 100 stops moving and begins sliding back into the rut. Timing the automatic shifting between forward and reverse gears with the rocking of the vehicle 100 in this manner can take advantage of the backsliding momentum of the vehicle 100 in both directions to help extricate the vehicle 100 from a stuck condition.

While Equations 1 and 2 described above may be used to estimate the time to begin spinning the wheels 102, 104 (and, thus, the time to initiate a gear shift to do so), other more complicated equations may alternatively be used. For example, Equations 1 and 2 assume movement along a straight line with constant acceleration. By contrast, the vehicle 100 being rocked in a rut is likely to undergo some non-linear movement as the wheels 102, 104, 106, 108 ride up and down the sides of the rut and/or slide laterally. Thus, in some examples, more complex calculations may be performed to obtain more accurate results. In some such examples, additional input parameters such as, for example, feedback from a lateral acceleration sensor and/or a vertical acceleration sensor may also be used. However, in many situations, the approximation provided by Equations 1 and 2 is sufficient to take advantage of the momentum of vehicle 100 as it is rocked back and forth.

While an example manner of implementing the control system 109 of the vehicle 100 is illustrated in FIG. 1, one or more of the elements, processes and/or devices illustrated in FIG. 1 may be combined, divided, re-arranged, omitted, eliminated and/or implemented in any other way. For example, the stuck mode controller 126 may be implemented as part of the traction control system 116 and/or incorporated into one or more other specific electronic control units of the vehicle 100. Further, the example drive system 110, the example engine controller 112, the example brake system 114, the example traction control system 116, the example driven wheel speed sensors 118, the example non-driven wheel speed sensors 120, the example longitudinal acceleration sensor 122, the example user interface 124, the example stuck mode controller 126, the example accelerator pedal sensor 128, the example proximity sensors 130, and/or, more generally, the control system 109 of the example vehicle 100 of FIG. 1 may be implemented by hardware, software, firmware and/or any combination of hardware, software and/or firmware. Thus, for example, any of the example drive system 110, the example engine controller 112, the example brake system 114, the example traction control system 116, the example driven wheel speed sensors 118, the example non-driven wheel speed sensors 120, the example longitudinal acceleration sensor 122, the example user interface 124, the example stuck mode controller 126, the example accelerator pedal sensor 128, the example proximity sensors 130, and/or, more generally, the example control system 109 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example drive system 110, the example engine controller 112, the example brake system 114, the example traction control system 116, the example driven wheel speed sensors 118, the example non-driven wheel speed sensors 120, the example longitudinal acceleration sensor 122, the example user interface 124, the example stuck mode controller 126, the example accelerator pedal sensor 128, and/or the example proximity sensors 130 is/are hereby expressly defined to include a tangible computer readable storage device or storage disk such as a memory, a digital versatile disk (DVD), a compact disk (CD), a Blu-ray disk, etc. storing the software and/or firmware. Further still, the example control system 109 of the vehicle 100 of FIG. 1 may include one or more elements, processes and/or devices in addition to, or instead of, those illustrated in FIG. 1, and/or may include more than one of any or all of the illustrated elements, processes and devices.

Flowcharts representative of example methods for implementing the control system 109 of FIG. 1 is shown in FIGS. 2-5. In these examples, the methods may be implemented using machine readable instructions that comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example methods are described with reference to the flowcharts illustrated in FIGS. 2-5, many other methods of implementing the example control system 109 of the vehicle 100 may alternatively be used. For example, the order of execution of the blocks may be changed, and/or some of the blocks described may be changed, eliminated, or combined.

As mentioned above, the example processes of FIGS. 2-5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 2-5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 2:
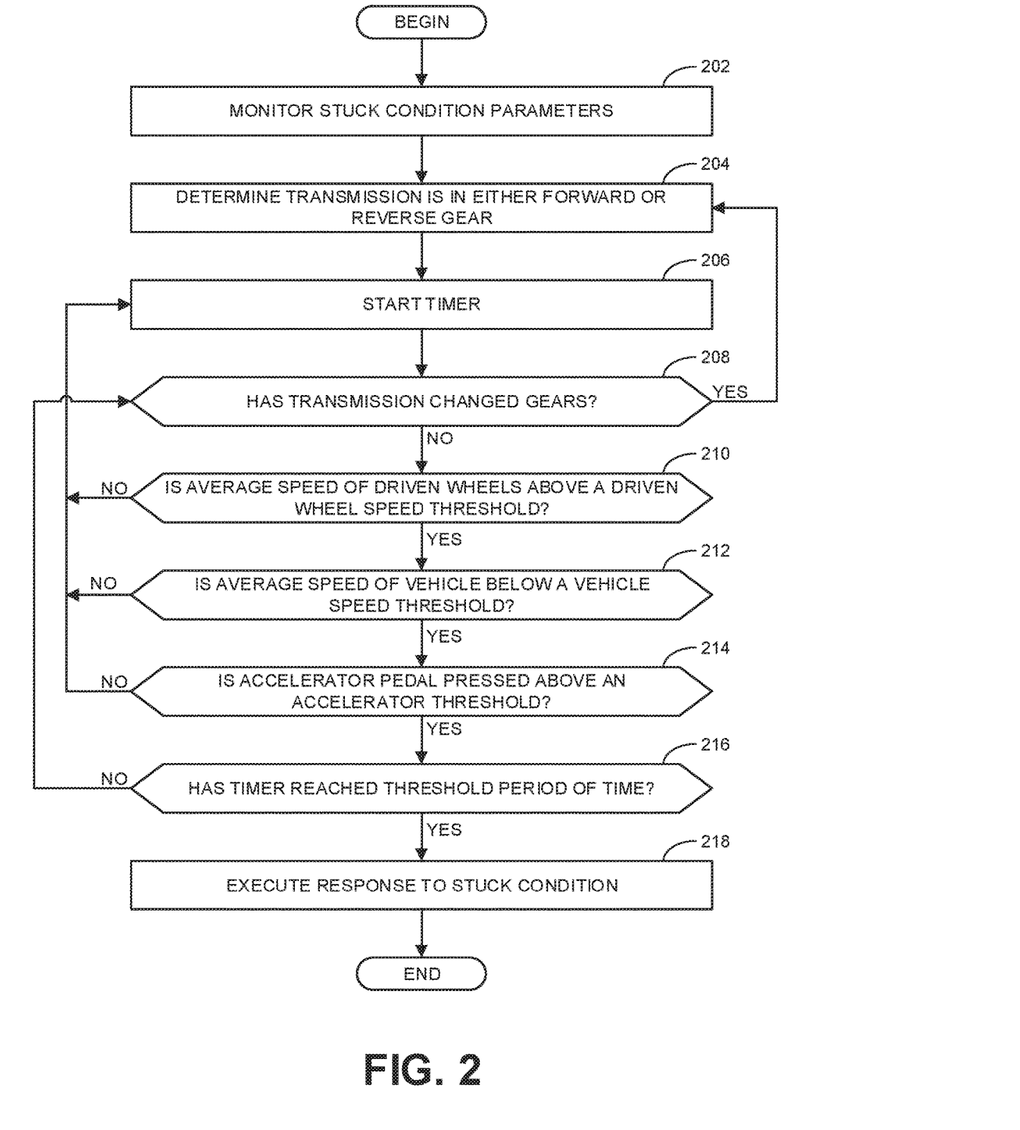
FIG. 2 is a flowchart illustrating an example method to implement the example control system of FIG. 1 to detect when the vehicle is in a stuck condition.

FIG. 2 is a flowchart illustrating an example method to implement the example control system 109 of the example vehicle 100 of FIG. 1 to detect when the vehicle 100 is in a stuck condition. The example method of FIG. 2 begins at block 202 where the stuck mode controller 126 monitors stuck condition parameters. As used herein, stuck condition parameters refer to any inputs to the stuck mode controller 126 used to determine whether the vehicle 100 is in a stuck condition and/or used to assist the driver in extricating the vehicle 100 from a stuck condition. Thus, the stuck condition parameters may include feedback from the driven wheel speed sensors 118, the non-driven wheel speed sensors 120, the longitudinal acceleration sensor 122, the accelerator pedal sensor 128, the proximity sensors 130, and/or any other sensors in the vehicle (e.g., measuring lateral acceleration, vertical acceleration, ambient temperature, yaw rate, roll rate, etc.). Further, the stuck condition parameters may include the current gear of the transmission and the amount of torque being delivered to the driven wheels 102, 104 as provided by the drive system 110. Further still, the stuck condition parameters may also include an indication of the application of brakes as provided by the braking system 114. In some examples, the stuck condition parameters are provided directly to the stuck mode controller 126 for analysis. In other examples, one or more of the stuck condition parameters may be analyzed by the traction control system 116 and/or other ECU in the vehicle 100 and subsequently provided to the stuck mode controller 126.

At block 204, the example stuck mode controller 126 determines that the transmission is in either forward or reverse gear. At block 206, the example stuck mode controller 126 starts a timer. At block 208, the stuck mode control 126 determines whether the transmission has changed gears. If so, control returns to block 204. Otherwise, control advances to block 210, where the example stuck mode controller 126 determines whether an average speed of the driven wheels 102, 104 is above a driven wheel speed threshold. The threshold value may be any suitable value above a non-moving state (e.g., 5 miles per hour (mph), 10 mph, 12 mph, etc.) to indicate that the driven wheels 102, 104 are not at rest but rotating as they are driven by the engine. If the average speed of the driven wheels 102, 104 does not exceed the driven wheel speed threshold, the stuck condition of the vehicle 100 cannot be determined such that control returns to block 206 to restart the timer. If the average speed of the driven wheels 102, 104 does exceed the driven wheel speed threshold, control advances to block 212.

At block 212, the example stuck mode controller 126 determines whether the average speed of the vehicle 100 is below a vehicle speed threshold. In some examples, the vehicle speed threshold is determined based on the average speed of the non-driven wheels 106, 108. In some examples, the vehicle speed threshold is defined to be less than the driven wheel speed threshold. More particularly, the vehicle speed threshold may be defined to correspond to a substantially non-moving condition (e.g., speeds less than a threshold of 1 mph). An average speed of the non-driven wheels 106, 108 being less than threshold (e.g., 1 mph) while the average speed of the driven wheels 102, 104 exceeds a separate threshold (e.g., above 10 mph) is an indication that the vehicle is in a stuck condition because the vehicle 100 is not moving while the driven wheels 102, 104 are spinning. When a vehicle 100 is stuck in a rut, it is likely that the vehicle 100 will move slightly backward and forward within the rut such that the speed of the non-driven wheels 106, 108 may exceed the vehicle speed threshold at any given point in time. However, when averaged over time, the speed will likely not be much greater than 0 mph. The possible variation in the amount of slight movements of the vehicle 100 while in a stuck condition accounts for why the vehicle speed threshold may be non-zero in some examples. If the example stuck mode controller 126 determines that the average speed of the vehicle 100 is not below the vehicle speed threshold (block 212), control again returns to block 206 to restart the timer because movement of the vehicle 100 (indicated by movement of the non-driven wheels 106, 108) is contrary to a determination of a stuck condition. On the other hand, if the example stuck mode controller 126 determines that the average speed of the vehicle 100 is below the vehicle speed threshold, control advances to block 214.

At block 214, the example stuck mode controller 126 determines whether the accelerator pedal is pressed above an accelerator threshold. The accelerator pedal position provides an indication of the intent of the driver based on the amount of torque demand associated with the accelerator pedal position. In some examples, the threshold is set at an appreciable distance (e.g., 30% of full throttle) to indicate situations when the driver desires to cause the vehicle 100 to move, or at least cause the driven wheels 102, 104 to spin. In some examples, the threshold may be relatively high (e.g., 80% of full throttle) to indicate situations when the driver desires to spin the wheels 102, 104 quickly. A driver's intent to torque the wheels 102, 104 when the actual movement of the vehicle 100 is negligible (e.g., based on the average speed of the non-driven wheels 106, 108 being below the vehicle speed threshold) is a further indication that the vehicle 100 is in a stuck condition. If the example stuck mode controller 126 determines that the accelerator pedal is not pressed above an accelerator threshold, control returns to block 206 to restart the timer. If the accelerator pedal is pressed above the accelerator threshold, control advances to block 216. In some examples, block 214 may be omitted.

At block 216, the example stuck mode controller 126 determines whether the timer has reached a threshold period of time. In some examples, block 216 serves to ensure that each of the conditions in blocks 210, 212, 214 are satisfied for a threshold period of time. Thus, if the timer has not reached the threshold period of time, control returns block 208 to verify the transmission has not changed gears and to again check each of the conditions of blocks 210, 212, 214. If the timer has reached the threshold period of time, control advances to block 218. The threshold period of time may be any suitable time period (e.g., 1 second, 2 seconds, 5 seconds, etc.).

Reaching block 218 indicates that the vehicle 100 is likely in a stuck condition. Accordingly, at block 218, the example stuck mode controller 126 executes a response to the stuck condition. In some examples, the response of the stuck mode controller 126 is to prompt the driver with the option to turn OFF traction control to assist the driver in attempting to remove the vehicle 100 from the stuck condition. In some examples, the response of the stuck mode controller 126 is to automatically cause the traction control to be deactivated without directly receiving a command from the driver to do so. In some examples, the automatic deactivation of the traction control is only implemented upon further confirmation that the vehicle is in a stuck condition as further outlined below in connection with FIG. 3. In some examples, the response of the stuck mode controller 126 is to prompt the driver with the option to enable autonomous control of the vehicle 100 to extricate the vehicle 100 from the stuck condition without involvement of the driver. Further detail regarding the autonomous control of the vehicle 100 is provided below in connection with FIGS. 4 and 5. Once the example stuck mode controller 126 has executed the appropriate response, the example method of FIG. 2 ends.

Figure 3:
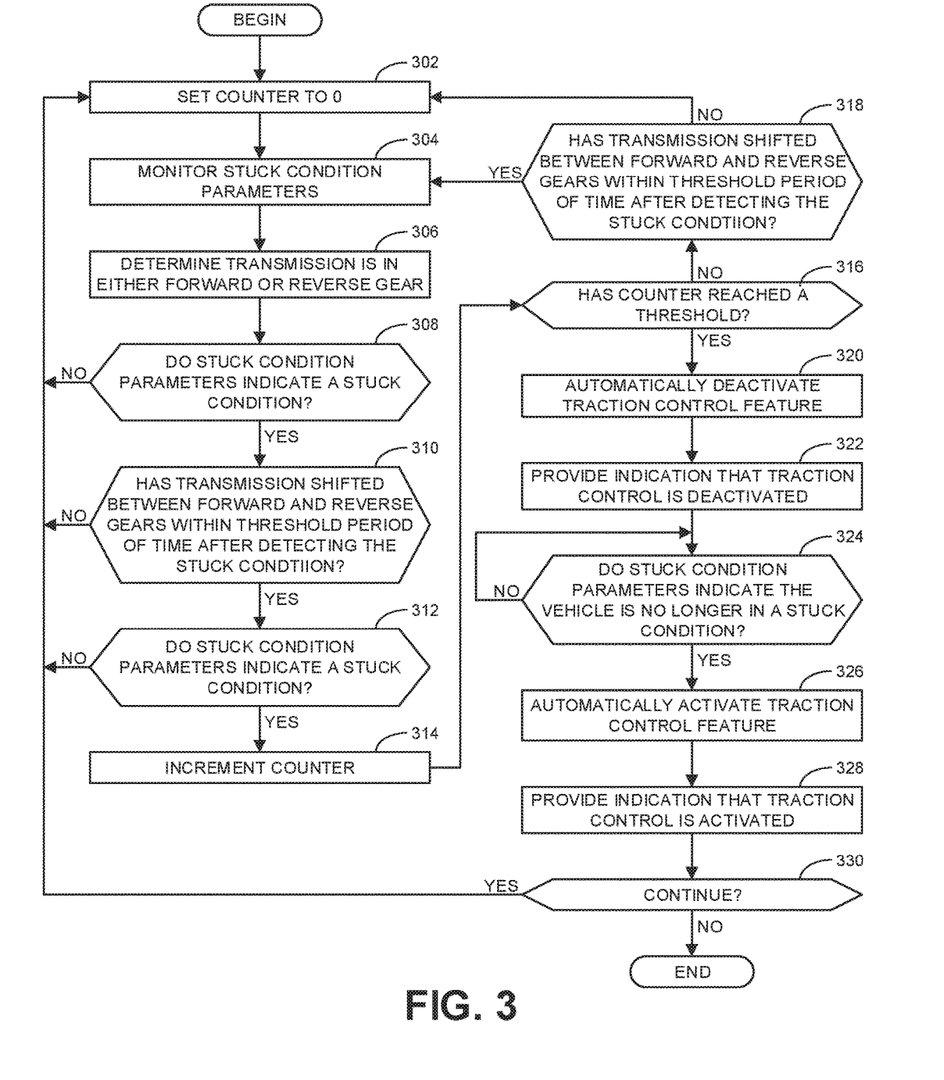
FIG. 3 is a flowchart illustrating an example method to implement the example control system of FIG. 1 to automatically deactivate a traction control feature of the vehicle when in a stuck condition.

FIG. 3 is a flowchart illustrating an example method to implement the example control system of the vehicle of FIG. 1 to automatically deactivate a traction control feature of the vehicle 100 when in a stuck condition. The example method of FIG. 3 begins at block 302 where the example stuck mode controller 126 sets a counter to 0. At block 304, the example stuck mode controller 126 monitors stuck condition parameters. At block 306, the example stuck mode controller 126 determines that the transmission is in either forward or reverse gear. At block 308, the example stuck mode controller 126 determines whether the stuck condition parameters indicate a stuck condition. In some examples, block 308 is implemented similar to the combined sequence of blocks 206, 208, 210, 212, 214, and 216 described above in connection with FIG. 2. If the stuck condition parameters do not indicate a stuck condition, control returns to block 302 to set the counter to 0. If the stuck condition parameters do indicate a stuck condition, control advances to block 310.

At block 310, the example stuck mode controller 126 determines whether the transmission has shifted between the forward and reverse gears within a threshold period of time after detecting the stuck condition. That is, if the vehicle 100 started in forward gear, the example stuck mode controller 126 determines that the transmission has been shifted to reverse gear within a threshold period of time (e.g., 5 second, 10 seconds, etc.) after detecting the stuck condition. The relatively rapid shifting of gears following the detection of a stuck condition may be indicative that the driver of the vehicle 100 is attempting to rock the vehicle 100 back and forth to remove the vehicle 100 from a rut. If the example stuck mode controller 126 does not determine the transmission shift within the threshold period of time, control returns to block 302. If the example stuck mode controller 126 determines that the transmission did shift within the threshold period of time, control advances to block 312.

At block 312, the example stuck mode controller 126 determines whether the stuck condition parameters indicate a stuck condition. In some examples, block 312 is implemented similar to the combined sequence of blocks 206, 208, 210, 212, 214, and 216 described above in connection with FIG. 2. That is, block 312 is the same as block 308 except that the gear of the transmission has switched from forward to reverse or vice versa. If the stuck condition parameters do not indicate a stuck condition at block 312, control returns to block 302 to set the counter to 0. If the stuck condition parameters do indicate a stuck condition, control advances to block 314 where the example stuck mode controller 126 increments the counter.

At block 316, the example stuck mode controller 126 determines whether the counter has reached a threshold (e.g., 1, 2, 3, etc.). If not, control advances to block 318 where the example stuck mode controller 126 determines whether the transmission has shifted between the forward and reverse gears within a threshold period of time after detecting the stuck condition. If so, control returns to block 304 to continue monitoring the stuck condition parameters. Otherwise, control returns to block 302 to reset the counter to 0. In an example where the counter threshold is 2, the rocking of the vehicle 100 back and forth in each direction is detected twice before the threshold is reached. In some examples, the counter may be incremented immediately after block 308 in addition to after block 314 and compared to the threshold each time the transmission shifts gears.

When the counter threshold is reached, there is a high likelihood that the user is in a stuck condition and attempting to rock the vehicle 100 out of a rut because there are no other conditions in which a driver would normally repeatedly spin the wheels 102, 104 in alternate directions while the vehicle 100 is not moving. Accordingly, if, at block 316, the example stuck mode controller 126 determines that the counter is has reached the threshold, control advances to block 320 where the example stuck mode controller 126 automatically deactivates the traction control feature. In some examples, the stuck mode controller 126 may directly deactivate or disable the traction control. In other examples, the stuck mode controller 126 may provide a command to the traction control system 116 to deactivate the traction control.

At block 322, the example user interface 124 provides an indication that the traction control is deactivated. At block 324, the example stuck mode controller 126 determines whether the suck condition parameters indicate the vehicle 100 is no longer in a stuck condition. In some examples, the stuck condition parameters indicate the vehicle 100 is no longer stuck when the vehicle 100 is moving above a threshold speed (e.g., 5 mph) as determined based on the average speed of the non-driven wheels 106, 108. In some examples, the non-driven wheels 106, 108 may be rolling slightly while the driven wheels 102, 104 are spinning at a much faster rate such that the vehicle 100, though moving, is not actually unstuck. Accordingly, in some examples, the stuck mode controller 126 determines the vehicle 100 is no longer stuck when the vehicle 100 is moving above a threshold speed and a difference between the average speed of the driven wheels 102, 104 and the non-driven wheels 106, 108 is less than a threshold. Such a situation indicates both that the vehicle 100 is moving and that the driven wheels 102, 104 are not slipping relative to the non-driven wheels 106, 108. If the suck condition parameters do not indicate the vehicle 100 is no longer in a stuck condition (block 324), control remains at block 324. If the suck condition parameters do indicate the vehicle 100 is no longer in a stuck condition, control advances to block 326.

At block 326, the example stuck mode controller 126 automatically activates the traction control feature. At block 328, the example user interface 124 provides an indication that the traction control is activated. At block 330, the example stuck mode controller 126 determines whether to continue. If so, control returns to block 302. Otherwise, the example method of FIG. 3 ends.

Figure 4:
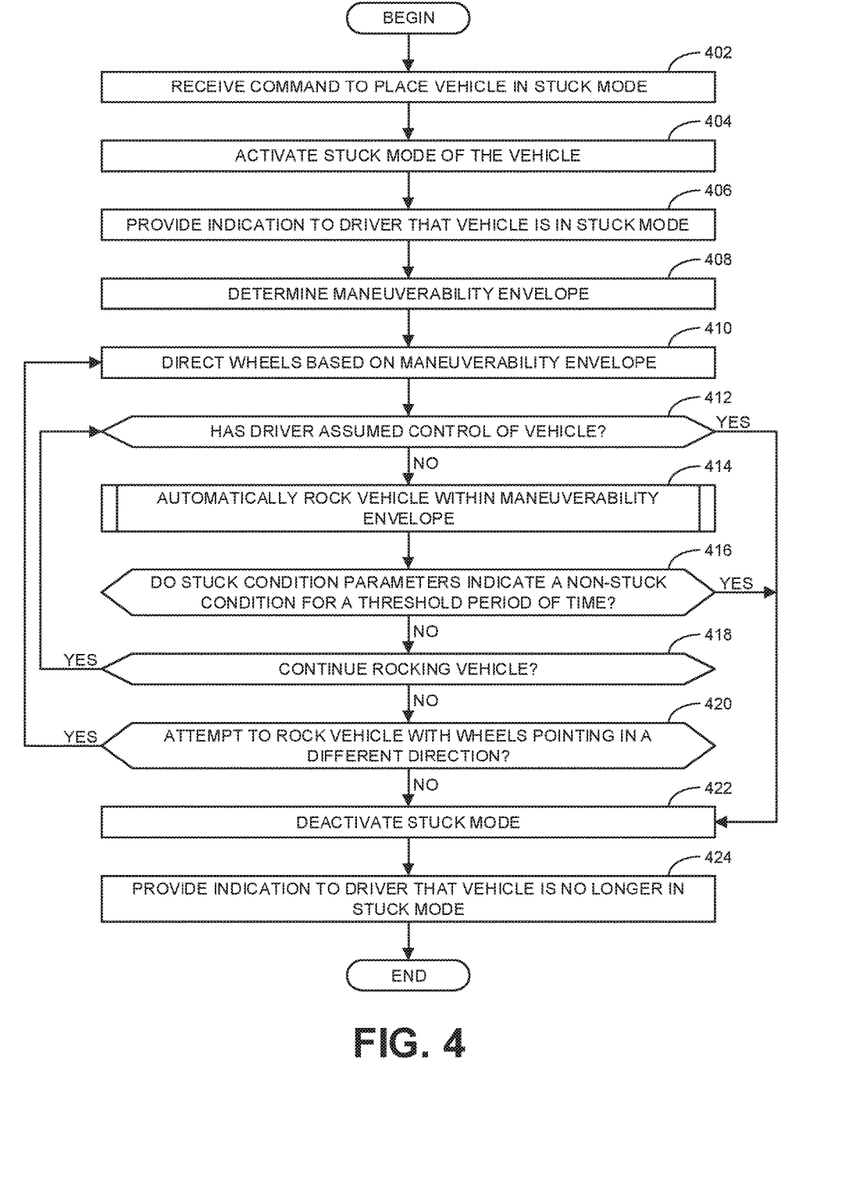
FIG. 4 is a flowchart illustrating an example method to implement the example control system of FIG. 1 to autonomously extricate the vehicle from a stuck condition.

FIG. 4 is a flowchart illustrating an example method to implement the example control system 109 of the vehicle 100 of FIG. 1 to autonomously extricate the vehicle 100 from a stuck condition. The example method begins at block 402 where the user interface 124 receives a command to place vehicle 100 in a stuck mode. In some examples, the stuck mode corresponds to an autonomous control mode of the vehicle 100. The command may be provided from a driver in response to a prompt provided in connection with block 218 of FIG. 2. In some examples, the driver may provide the command independent of the flowchart of FIG. 2. At block 404, the example stuck mode controller 126 activates the stuck mode of the vehicle 100. In some examples, the stuck mode of the vehicle is an autonomous control mode of the vehicle 100. In some examples, the traction control feature of the vehicle 100 is automatically deactivated when the stuck mode is activated. In some examples, the traction control may remain activate but the threshold and/or other parameters used to define the control of the engine throttling and/or the application of brakes is adjusted. At block 406, the example user interface 124 provides an indication to the driver that the vehicle 100 is in the stuck mode.

At block 408, the example stuck mode controller 126 determines a maneuverability envelope. As described above, the maneuverability envelope defines the available area surrounding the vehicle 100 in which the vehicle 100 may maneuver. In some examples, the stuck mode controller 126 determines the maneuverability envelope based on feedback from the proximity sensors 130 that detect the proximity of objects surrounding the vehicle 100. In some examples, the stuck mode controller 126 also determined the nature of the maneuverability envelope such as, for example, the angle or slope of the surface on which the vehicle 100 is resting. In some example, the maneuverability envelope is monitored in substantially real-time throughout the example method of FIG. 4 such that any changes in the envelope (e.g., a person walking into the envelope) may be detected and appropriate action taken (e.g., terminating and/or adjusting control of the vehicle 100).

At block 410, the example stuck mode controller 126 drive system 110 directs the wheels 102, 104 based on the maneuverability envelope. In some examples, the default direction of the wheels 102, 104 may be directed straight ahead if, for example, there are no detected obstructions limiting the maneuverability envelope. In some examples, the wheels 102, 104 may be directed to either the left or the right based on obstacles detected near either side of the vehicle 100 and/or based on the slope of the ground as detected within the maneuverability envelope.

At block 412, the example stuck mode controller 126 determines whether the driver has assumed control of the vehicle 100. For example, the stuck mode controller 126 may detect that the driver has turned the steering wheel, stepped on the brake pedal, stepped on the accelerator pedal, etc. If so, control advances to block 422 where the example stuck mode controller 126 deactivates the stuck mode. That is, the autonomous control of the vehicle 100 is automatically terminated as soon as there is an indication that the driver has assumed control of the vehicle 100. If the driver has not assumed control of the vehicle 100, control advances to block 414 to automatically rock the vehicle 100 within the maneuverability envelope. Further detail regarding block 414 is provided below in connection with FIG. 5.

At block 416, the example stuck mode controller 126 determines whether the stuck condition parameters indicate a non-stuck condition for a threshold period of time. As described above, the stuck condition parameters may include feedback from the driven wheel speed sensors 118, the non-driven wheel speed sensors 120, and/or other sensors in the vehicle 100. In some examples, the stuck mode controller 126 determines a non-stuck condition for the vehicle 100 when the difference in the average speed of the driven wheels 102, 104 and the non-driven wheels 106, 108 is less than a first threshold (e.g., within 2 mph, 5 mph, etc.) when the vehicle 100 is moving (e.g., the speed of the non-driven wheels 106, 108 is non-zero) for the threshold period of time (e.g., 1 second, 2 seconds, etc.). If the example stuck mode controller 126 determines that the stuck condition parameters indicate a non-stuck condition, then control advances to block 422 to deactivate the stuck mode because the vehicle 100 is no longer stuck.

If the example stuck mode controller 126 determines the stuck condition parameters do not indicate a non-stuck condition (e.g., the vehicle 100 is still stuck), control advances to block 418 where the example stuck mode controller 126 determines whether to continue rocking the vehicle 100. In some examples, the rocking may continue for a set period of time (e.g., 15 seconds, 30 seconds, 1 minute, etc.). In some examples the rocking may continue for a set number of gear shifts between the forward and reverse direction (e.g., spinning the driven wheels 102, 104 twice in each direction, spinning the driven wheels 102, 104 three times in each direction, spinning the driven wheels 102, 104 in the forward direction at least four times, etc.). If the example stuck mode controller 126 determines to continue rocking the vehicle 100, control returns to block 412. Otherwise, control advances to block 420.

At block 420, the example stuck mode controller 126 determines whether to attempt to rock the vehicle 100 with the wheels 102, 104 pointing in a different direction. For example, the autonomous rocking of the vehicle 100 (block 414) may initially be executed with the driven wheels 102, 104 pointing straight forward. If the vehicle 100 is unable to become unstuck, the example stuck mode controller 126 may attempt to rock the vehicle 100 with the wheels 102, 104 pointing to either the left of the right. If the example stuck mode controller 126 attempts to rock the vehicle 100 with the wheels 102, 104 pointing in a different direction, control returns to block 410 to direct the wheels 102, 104 accordingly. Otherwise, control advances to block 422 where the example the example stuck mode controller 126 deactivates the stuck mode. At block 424, the example user interface 124 provides an indication to the driver that the vehicle 100 is no longer in the stuck mode. Thereafter, the example method of FIG. 4 ends.

Figure 5:
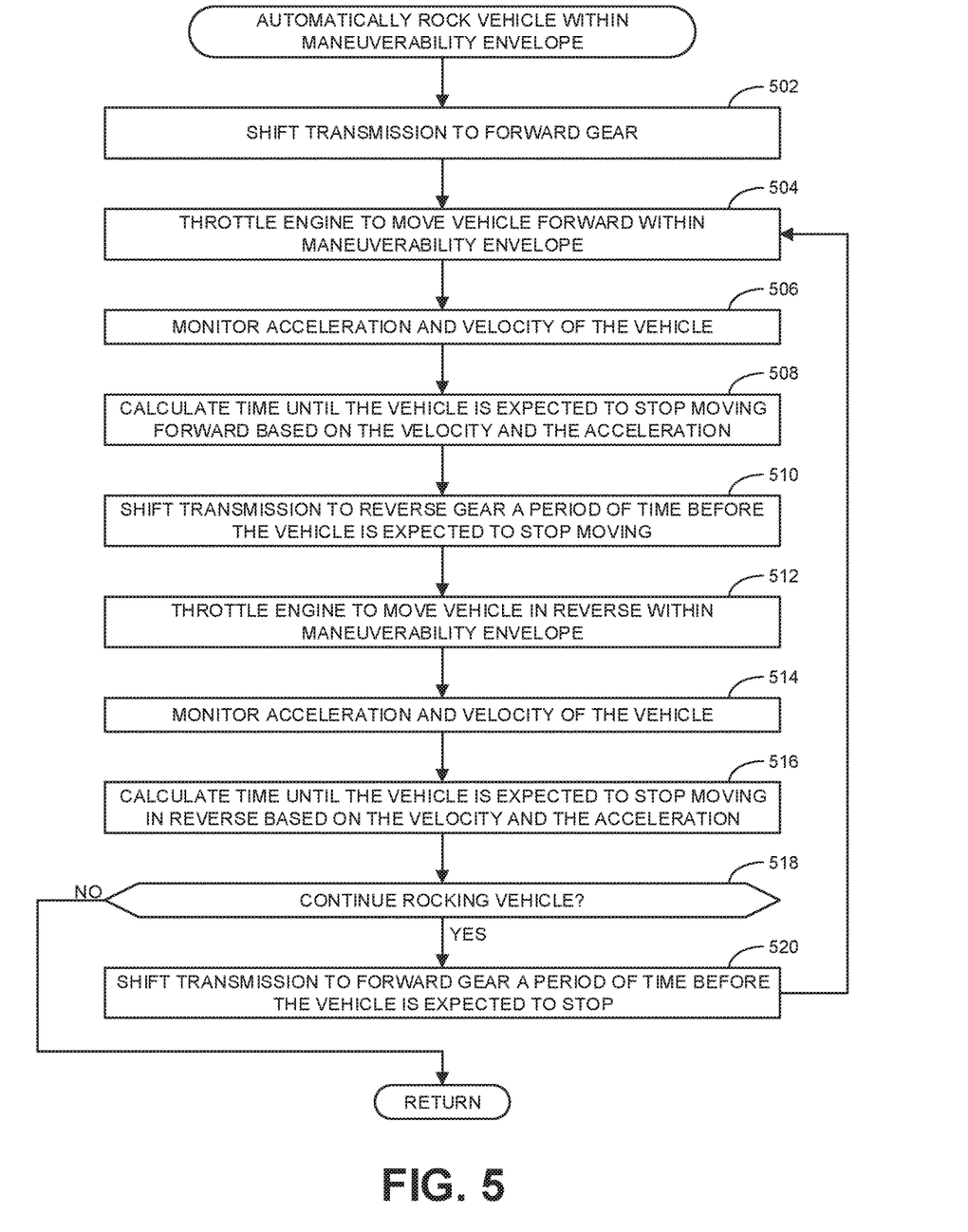
FIG. 5 is a flowchart illustrating an example method to implement the example control system of FIG. 1 to autonomously rock the vehicle in connection with the flowchart of FIG. 4.

FIG. 5 is a flowchart illustrating an example method to implement the example control system 109 of the vehicle 100 of FIG. 1 to autonomously rock the vehicle 100. As described above, the example method of FIG. 5 may be followed to implement block 414 of FIG. 4. The example method begins at block 502, where the example drive system 110 shifts the transmission to forward gear. In some examples, the transmission may initially be shifted into the reverse gear instead of the forward gear. In some examples, whether the vehicle 100 begins in drive or reverse is based on the maneuverability envelope defined around the vehicle 100.

At block 504, the example engine controller 112 throttles the engine to move the vehicle 100 forward within the maneuverability envelope. Although the vehicle 100 is stuck in a rut, slight movement will likely occur along with the spinning and slipping of the driven wheels 102, 104. In some examples, the speed at which the driven wheels 102, 104 are torqued or spun is controlled based on the maneuverability envelope. For example, if there is relatively little space in front of the vehicle 100 within which the vehicle 10 can maneuver, a relatively low speed or low torque may be applied to the wheels 102, 104 (e.g., to maintain the speed below a threshold speed) to reduce the likelihood of the vehicle 100 hitting nearby objects if the vehicle 100 becomes unstuck and escapes the rut in which the vehicle 100 is stuck. By contrast, a relatively large maneuverability envelope may correspond to higher torques and faster spinning wheels because there is less concern of the vehicle 100 hitting surrounding objects if it becomes unstuck. At block 506, the example stuck mode controller 126 monitors acceleration and velocity of the vehicle 100. In some examples, the acceleration is monitored via the longitudinal acceleration sensor 122. The velocity of the vehicle 100 may be monitored via the non-driven wheel speed sensors 120.

At block 508, the example stuck mode controller 126 calculates the time until the vehicle 100 is expected to stop moving forward based on the velocity and the acceleration. That is, the example stuck mode controller 126 calculates when the driven wheels 106, 108 lose substantially all traction such that they spin in place and the vehicle 100 is likely to begin sliding back into the rut associated with the stuck condition. In some examples, the time until the vehicle 100 is expected to stop moving is estimated by the ratio of the velocity of the vehicle 100 to the acceleration of the vehicle 100 as measured in substantially real-time. At block 510, the example drive system 110 shifts the transmission to reverse gear a period of time before the vehicle 100 is expected to stop moving. In some examples, the period of time corresponds to the duration to shift gears in the transmission and apply torque to the wheels 102, 104 in the opposite direction. Thus, in some examples, the drive system 110 begins shifting the transmission when the ratio of the velocity to the acceleration approximately corresponds to the period of time for the vehicle 100 to shift gears and deliver torque to the driven wheels 102, 104. In this manner, when the engine controller 112 throttles the engine to move the vehicle 100 in reverse (block 512), the driven wheels 102, 104 will begin spinning at substantially the same time as the vehicle 100 stops moving and begins backsliding into the rut, thereby taking advantage of the momentum of the vehicle 100 with the spinning of the wheels 102, 104.

At block 514, the example stuck mode controller 126 monitors the acceleration and the velocity of the vehicle 100. At block 516, the example stuck mode controller 126 calculates the time until the vehicle 100 is expected to stop moving in reverse based on the velocity and the acceleration. At block 518, the example stuck mode controller 126 determines whether to continue rocking the vehicle 100. If so, control advances to block 520 where the example drive system 110 shifts the transmission to the forward gear a period of time before the vehicle 100 is expected to stop moving before returning control to block 504. The period of time in block 520 corresponds to the same period of time described above in connection with block 510. If the example stuck mode controller 126 determines not to continue rocking the vehicle 100, the example method of FIG. 5 ends and returns to complete the example method of FIG. 4.

Figure 6:
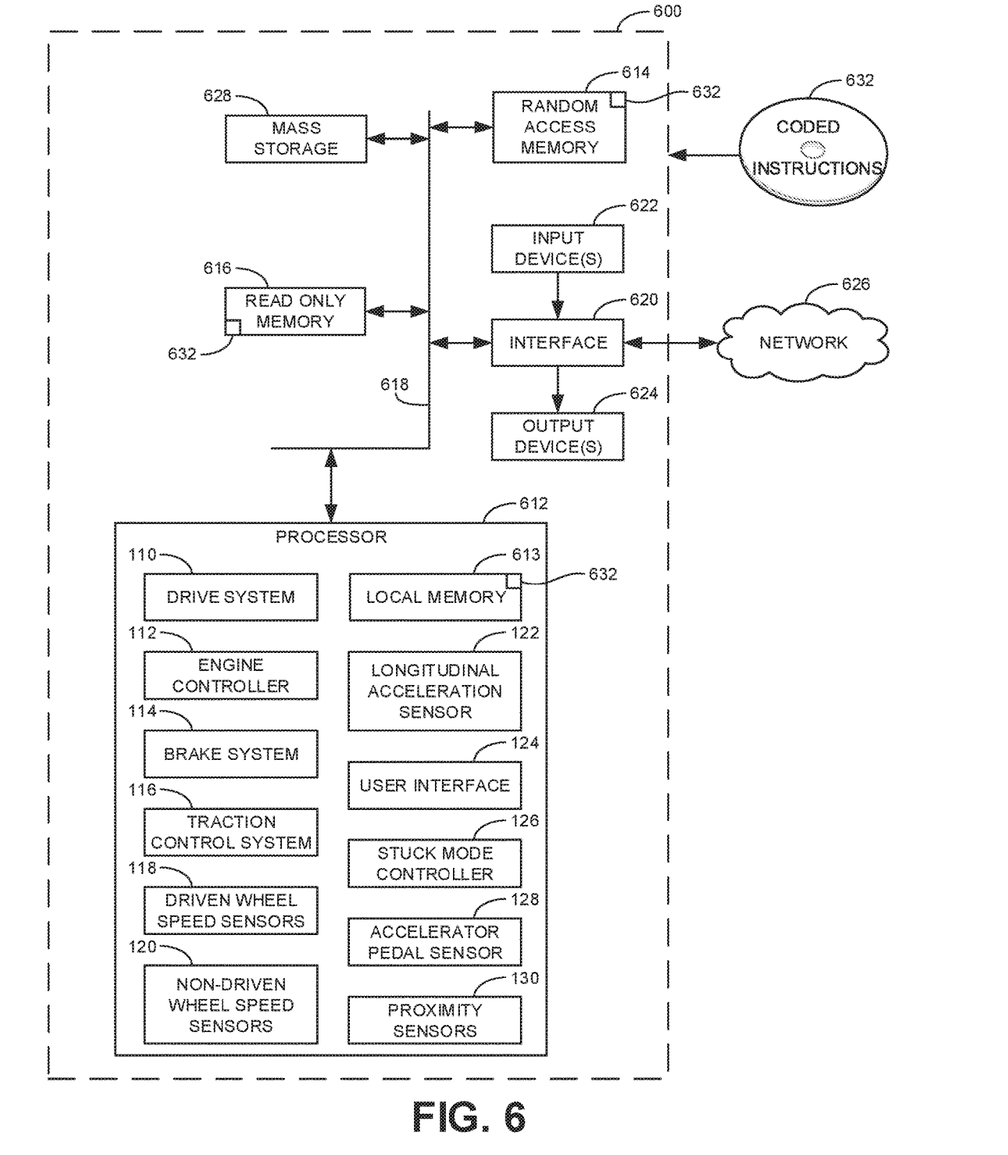
FIG. 6 is a block diagram of an example processor system structured to execute example machine readable instructions represented at least in part by FIGS. 2-5 to implement the example control system of the example vehicle of FIG. 1.

FIG. 6 is a block diagram of an example processor platform 600 capable of executing instructions to implement the methods of FIGS. 2-5 to implement the control system 109 of the vehicle 100 of FIG. 1. The processor platform 600 can be, for example, a server, a personal computer, a mobile device (e.g., a cell phone, a smart phone, a tablet such as an iPad™), or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). In some examples, the processor 612 executes one or more of the example drive system 110, the example engine controller 112, the example brake system 114, the example traction control system 116, the example driven wheel speed sensors 118, the example non-driven wheel speed sensors 120, the example longitudinal acceleration sensor 122, the example user interface 124, the example stuck mode controller 126, the example accelerator pedal sensor 128, and/or the example proximity sensors 130. The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

Coded instructions 632 to implement the methods of FIGS. 2-5 may be stored in the mass storage device 628, in the volatile memory 614, in the non-volatile memory 616, and/or on a removable tangible computer readable storage medium such as a CD or DVD.

From the foregoing, it will be appreciated that the above disclosed methods, apparatus and articles of manufacture provide assistance to a driver in attempting to extricate a vehicle from a stuck condition. In some examples, when the driver alternately spins the wheels 102, 104 back and forth in an effort to rock the vehicle 100 out of a rut, the traction control feature of the vehicle 100 may be automatically disabled or deactivated. This can save the driver time from having to locate the manual switch for the traction control. Further, this can help the driver who either forgets to manually disable the traction control or is not aware of the ability and/or advantages of disabling traction control when the vehicle 100 is in a stuck condition. Beyond automatically disabling traction control, in some examples, the vehicle 100 may enter a fully autonomous mode in which the torqueing of the wheels 102, 104 alternately in the forward and reverse directions and the shifting between gears is autonomously controlled. Autonomous control of the vehicle 100 in this manner can enable improved timing of the gear shifting and torque application such that the wheels 102, 104 begin spinning approximately at the same time that the vehicle stops moving in one direction and begins sliding back into the rut to take advantage of the momentum of the vehicle. Furthermore, the autonomous control of the vehicle can increase the safety of attempts to extricate the vehicle 100 from a rut because a maneuverability envelope can be determined and monitored in real-time to define the speed at which the wheels 102, 104 are to be driven and/or the direction in which the wheels 102, 104 are to point to reduce the likelihood that the vehicle 100 will collide into an object once the vehicle 100 escapes the rut.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
    receiving a command to place a vehicle in a stuck mode, the stuck mode corresponding to an autonomous control mode of the vehicle;
    autonomously torqueing driven wheels of the vehicle alternately in a reverse direction and a forward direction to rock the vehicle within a rut associated with a stuck condition;
    autonomously shifting a transmission of the vehicle alternately between a reverse gear and a forward gear of the vehicle;
    calculating a ratio of a velocity of the vehicle to an acceleration of the vehicle in substantially real-time; and
    shifting the transmission when the ratio approximately corresponds to a time period for the vehicle to shift gears and deliver torque to the driven wheels.

2. The method of claim 1, further including determining a maneuverability envelope surrounding the vehicle, the autonomous control of the vehicle to be based on the maneuverability envelope.

3. The method of claim 2, further including autonomously controlling a direction of wheels of the vehicle during the autonomous control of the vehicle based on the maneuverability envelope.

4. The method of claim 1, further including automatically deactivating the stuck mode of the vehicle in response to determining that the vehicle is no longer in the stuck condition.

5. The method of claim 1, further including:
    detecting that the vehicle is in the stuck condition; and
    prompting a driver of the vehicle to authorize the vehicle to be placed in the stuck mode in response to detecting the stuck condition.

6. The method of claim 1, further including prior to receiving the command to place the vehicle in the stuck mode:
    detecting that the vehicle is in the stuck condition; and
    automatically deactivating a traction control feature of the vehicle in response to detecting the stuck condition.

7. A method comprising:
    receiving a command to place a vehicle in a stuck mode, the stuck mode corresponding to an autonomous control mode of the vehicle;
    determining a maneuverability envelope surrounding the vehicle;
    autonomously controlling the vehicle in the stuck mode to attempt to move the vehicle out of a rut associated with a stuck condition; and
    autonomously maintaining a speed of driven wheels of the vehicle below a threshold speed during the autonomous control of the vehicle, the threshold speed defined based on the maneuverability envelope.

8. The method of claim 7, wherein the threshold speed when the vehicle is being driven forward is different than when the vehicle is being driven in reverse.

9. An apparatus comprising:
    a user interface to receive a command to place a vehicle in a stuck mode, the stuck mode corresponding to an autonomous control mode of the vehicle; and
    a stuck mode controller to:
        autonomously torque driven wheels of the vehicle alternately in a reverse direction and a forward direction to rock the vehicle within a rut associated with a stuck condition;
        calculate a ratio of a velocity of the vehicle to an acceleration of the vehicle in substantially real-time; and
        autonomously shift a transmission of the vehicle alternately between a reverse gear and a forward gear of the vehicle, the shifting of the transmission timed to correspond to when the ratio approximately corresponds to a time period for the vehicle to shift gears and deliver torque to the driven wheels.

10. The apparatus of claim 9, wherein the stuck mode controller is to determine a maneuverability envelope surrounding the vehicle, the autonomous control of the vehicle to be based on the maneuverability envelope.

11. The apparatus of claim 10, wherein the maneuverability envelope is defined based on sensor feedback indicating at least one of a distance or a location of an object in an area surrounding the vehicle.

12. The apparatus of claim 11, further including autonomously controlling a direction of wheels of the vehicle during the autonomous control of the vehicle based on the maneuverability envelope.

13. The apparatus of claim 11, further including autonomously maintaining a speed of the driven wheels of the vehicle below a threshold speed during the autonomous control of the vehicle, the threshold speed defined based on the maneuverability envelope.

14. The apparatus of claim 13, wherein the threshold speed when the vehicle is being driven forward is different than when the vehicle is being driven in reverse.

15. A tangible computer readable storage medium comprising instructions that, when executed cause a machine to at least:
    receive a command to place a vehicle in a stuck mode, the stuck mode corresponding to an autonomous control mode of the vehicle;
    autonomously torque driven wheels of the vehicle alternately in a reverse direction and a forward direction to rock the vehicle within a rut associated with a stuck condition;
    calculate a ratio of a velocity of the vehicle to an acceleration of the vehicle in substantially real-time; and
    autonomously shift a transmission of the vehicle alternately between a reverse gear and a forward gear of the vehicle, the shifting of the transmission timed to correspond to when the ratio approximately corresponds to a time period for the vehicle to shift gears and deliver torque to the driven wheels.

16. The tangible computer readable storage medium of claim 15, wherein the instructions further cause the machine to determine a maneuverability envelope surrounding the vehicle, the autonomous control of the vehicle to be based on the maneuverability envelope.

17. The tangible computer readable storage medium of claim 16, wherein the maneuverability envelope is defined based on sensor feedback indicating at least one of a distance or a location of objects detected in an area surrounding the vehicle.

18. The tangible computer readable storage medium of claim 17, wherein the instructions further cause the machine to autonomously control a direction of wheels of the vehicle during the autonomous control of the vehicle based on the maneuverability envelope.

19. The tangible computer readable storage medium of claim 17, wherein the instructions further cause the machine to autonomously maintain a speed of the driven wheels of the vehicle below a threshold speed during the autonomous control of the vehicle, the threshold speed defined based on the maneuverability envelope.

20. The tangible computer readable storage medium of claim 19, wherein the threshold speed when the vehicle is being driven forward is different than when the vehicle is being driven in reverse.

* * * * *